(12) United States Patent
Haile et al.

(10) Patent No.: US 7,563,533 B2
(45) Date of Patent: Jul. 21, 2009

(54) BA-SR-CO-FE-O BASED PEROVSKITE MIXED CONDUCTING MATERIALS AS CATHODE MATERIALS FOR SOLID OXIDE FUEL CELLS

(75) Inventors: Sossina M. Haile, Altadena, CA (US); Zongping Shao, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/861,828

(22) Filed: Jun. 4, 2004

(65) Prior Publication Data

US 2005/0026006 A1 Feb. 3, 2005

Related U.S. Application Data

(60) Provisional application No. 60/476,413, filed on Jun. 5, 2003.

(51) Int. Cl.
*H01M 4/90* (2006.01)
(52) U.S. Cl. .......................... 429/40; 429/41
(58) Field of Classification Search ............ 429/41, 429/44, 45, 46, 40; 423/593.1
See application file for complete search history.

(56) References Cited

U.S. PATENT DOCUMENTS

| | | | | |
|---|---|---|---|---|
| 4,395,468 A | * | 7/1983 | Isenberg | 429/31 |
| 4,861,345 A | * | 8/1989 | Bowker et al. | 29/623.1 |
| 5,543,239 A | * | 8/1996 | Virkar et al. | 429/33 |
| 6,632,554 B2 | * | 10/2003 | Doshi et al. | 429/30 |
| 2003/0012996 A1 | * | 1/2003 | Bitterlich et al. | 429/33 |

FOREIGN PATENT DOCUMENTS

EP 285727 A1 * 10/1988

OTHER PUBLICATIONS

Colomer et al., "Structural and electrochemical properties of the Sr0.8Ce0.1Fe0.7Co0.3O3-δ perovskite as cathode material fo ITSOFC", Solid State Ionics, 147 (2002) 41-48.*
Lee et al., "Oxygen permeation in SrCo0.8Fe0.2O3-δ. . . ", Solid State Ionics, 100 (1997) 87-94.*
Lee et al., "Oxygen permeation in dense SrCo0.8Fe0.2O3-δ. . . ", Solid State Ionics, 100 (1997) 77-85.*
Nisancioglu et al., "Oxygen diffusion in iron doped strontiumcobaltites", Proceedings Electrochemical Society (1993), 93-4 (Proceedings of the Third International Symposium on Solid Oxide Fuel Cells, 1993) 267-75.*
Shao et al., "Investigation of the permeation behavior and stability of a Ba0.5Sr0.5C00.8Fe0.2O3-d oxygen membrane", Journ of Membrane Science, 172 (2000) 177-188.*

* cited by examiner

*Primary Examiner*—Mark Ruthkosky
(74) *Attorney, Agent, or Firm*—Townsend and Townsend and Crew LLP

(57) ABSTRACT

Improved cathode active materials for reduced temperature operation in single and dual chamber solid oxide fuel cells are provided. The cathode active materials comprise perovskites of the general form $ABO_3$, where A is a cation with approximately a +2 charge, and B is a cation with approximately a +4 charge. These perovskite cathode materials exhibit substantially enhanced power generation at operation temperatures less than or equal to 600° C.

3 Claims, 3 Drawing Sheets

BA-SR-CO-FE-O BASED PEROVSKITE MIXED CONDUCTING MATERIALS AS CATHODE MATERIALS FOR SOLID OXIDE FUEL CELLS

CROSS-REFERENCE TO RELATED APPLICATION(S)

This application claims the benefit of Provisional Application Ser. No. 60/476,413, filed Jun. 5, 2003, entitled Ba—Sr—Co—Fe—O BASED PEROVSKITE MIXED CONDUCTING MATERIALS AS CATHODE MATERIALS FOR INTERMEDIATE TEMPERATURE SOLID OXIDE FUEL CELLS BOTH IN DUAL CHAMBER AND SINGLE CHAMBER CONFIGURATION, the entire disclosure of which is incorporated herein by reference.

STATEMENT REGARDING FEDERALLY SPONSORED RESEARCH OR DEVELOPMENT

The U.S. government has certain rights in this invention pursuant to Grant No. N66 001-01-1-8966, awarded by the Defense Advanced Research Projects Agency.

FIELD OF THE INVENTION

The present invention relates to perovskite cathode materials for use in reduced temperature solid oxide fuel cells.

BACKGROUND OF THE INVENTION

A traditional solid oxide fuel cell comprises a cathode, an anode and an electrolyte. Often, perovskites of the general form $ABO_{3-\delta}$ are used as the cathode active material. In such a configuration, A and B both represent cations, and these cations have historically both had charges of approximately +3.

The primary function of the cathode in the solid oxide fuel cell is to facilitate the electrochemical reduction of oxygen, which requires the diffusion of oxygen through the cathode. To that end, the use of +3 charged cations in the perovskite cathode material has long been thought to impart the fastest rate of oxygen diffusion. However, even with this configuration, oxygen diffusion remains the rate limiting step in the electroreduction process.

Notwithstanding the rate limiting nature of oxygen diffusion in cathodes utilizing this perovskite configuration, solid oxide fuel cells employing these cathode materials have exhibited satisfactory power generation at very high temperatures, i.e. 800-1000° C. Nonetheless, such high operating temperatures lead to high costs and limit material compatibility. For example, conventional solid oxide fuel cells use yttria-stabilized zirconia (YSZ) as an electrolyte. In these fuel cells, the transition metal perovskite $(La_{1-x}Sr_x)MnO_{3-\delta}$ (LSM) has traditionally served as the cathode. However, the electrochemical reduction of oxygen over LSM creates a high activation energy, rendering the LSM cathode material inappropriate for reduced temperature operation.

Efforts have been made to develop a cathode material suitable for reduced temperature operation. However, these efforts have focused on mixed electron and oxygen ion conducting perovskites such as doped $LaCoO_3$, doped $LaFeO_3$ and doped $SmCoO_3$. For example, the perovskites $La_{1-x}Sr_x\-Co_yFe_{1-y}O_{3-\delta}$ (LSCF) and $Sm_{0.5}Sr_{0.5}CoO_{3-\delta}$ (SSC) have shown particularly high activities in the 600 to 800° C. temperature range. Although these cathode materials exhibit substantially improved performance compared to LSM, no cathodes suitable for operation at temperatures less than 600° C. have yet been developed. Furthermore, these perovskite cathode materials are far too active for propane catalytic oxidation in high efficiency single chamber fuel cells. Accordingly, a need arises for a perovskite cathode material that exhibits accelerated oxygen diffusion, and that is suitable for reduced temperature operation in both single and dual chamber fuel cells.

SUMMARY OF THE INVENTION

The present invention is directed to a perovskite cathode material with accelerated oxygen diffusion for reduced temperature operation in both single and dual chamber solid oxide fuel cells. In one embodiment, the perovskite takes the general form $ABO_{3-\delta}$, where A is any cation with approximately a +2 charge, and B is any cation with approximately a +4 charge. In another embodiment, the A site cation is selected from the group consisting of alkaline earth metal cations, and the B site cation is selected from the group consisting of transition metal cations.

In a particularly preferred embodiment the A site cation comprises a mixture of cations, the average charge of the mixed cations being approximately +2. Alternatively, the B site cation can comprise a mixture of cations, the average charge of the mixed cations being approximately +4. Preferably, both the A and B site cations comprise mixtures of cations, the average charge of the mixed A site cations being approximately +2, and the average charge of the mixed B site cations being approximately +4.

In another preferred embodiment, the A site cation is selected from the group consisting of alkaline earth metal cations. More preferably, the A site cation is a mixture of alkaline earth metal cations. Even more preferably, the A site cation is a mixture of Ba and another alkaline earth metal cation.

In yet another preferred embodiment, the B site cation is selected from the group consisting of transition metal cations. More preferably, the B site cation is a mixture of transition metal cations. Even more preferably the B site cation is a mixture of Co and another transition metal cation. In a particularly preferred embodiment, the A site cation comprises a mixture of Ba and Sr, and the B site cation comprises a mixture of Co and Fe.

Historically, perovskite cathode materials have been stable only at high temperatures and high oxygen partial pressures. However, the perovskite cathode materials of the present invention are stable at substantially reduced temperatures. Furthermore, the perovskite configuration with a +2 charged A site cation and a +4 charged B site cation exhibits substantially accelerated oxygen diffusion through the cathode, eliminating oxygen diffusion as the rate limiting step in the electrochemical reduction of oxygen. In addition, this accelerated oxygen diffusion through the cathode enables the fuel cell to operate at substantially reduced temperatures, thereby reducing costs and eliminating limitations of material compatibility.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

Figure 1:
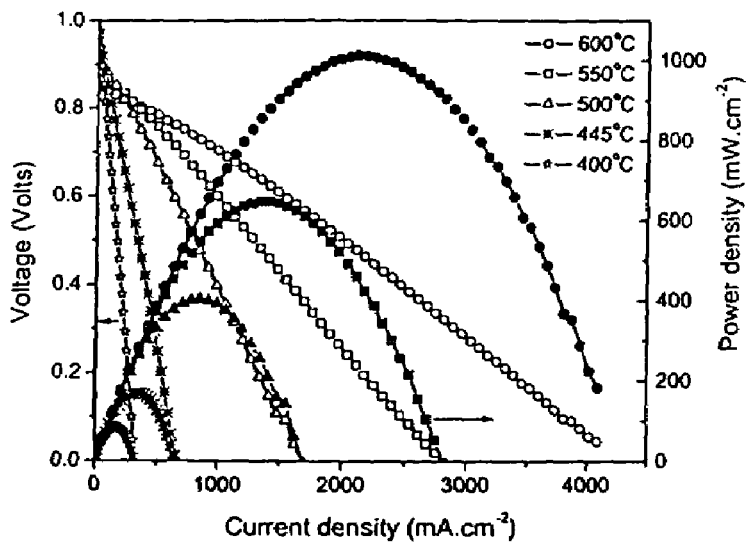
FIG. 1 is a graphical representation of the cell voltages and power densities of the BSCF cathode as functions of the current density, obtained through operation in a dual chamber solid oxide fuel cell.

The present invention is directed to a perovskite cathode active material for reduced temperature operation of single and dual chamber solid oxide fuel cells. In one embodiment, the perovskite takes the general form $ABO_{3-\delta}$, wherein A is any cation with approximately a +2 charge, and B is any cation with approximately a +4 charge. As is known in the art, $\delta$ represents the oxygen vacancy concentration, and is less than or equal to 1. Preferably, the A site cation is selected from the group consisting of alkaline earth metal cations having approximately a +2 charge, and the B site cation is selected from the group consisting of transition metal cations having approximately a +4 charge.

As used herein, the term "+2 charge" refers to a charge of approximately +2, and may vary slightly as necessary to maintain the neutrality of the perovskite based on the oxygen vacancy concentration, as determined by $\delta$. Similarly, the term "+4 charge" refers to a charge of approximately +4 and may vary slightly as necessary to maintain the neutrality of the perovskite based on the oxygen vacancy concentration as determined by $\delta$.

In a preferred embodiment, the perovskite takes the general form $(A'_{1-x}A''_{x})BO_{3-\delta}$, where A' and A'' are any cations, the average charge of A' and A'' is approximately +2, B is any cation having approximately a +4 charge, and x is less than or equal to 1. Preferably, both A' and A'' are selected from the group consisting of alkaline earth metal cations, and B is selected from the group consisting of transition metal cations.

Alternatively, the perovskite can take the general form $A(B'_{1-y}B''_{y})O_{3-\delta}$, where A is any cation having approximately a +2 charge, B' and B'' are any cations, the average charge of B' and B'' is approximately +4, and y is less than or equal to 1. Preferably, A is selected from the group consisting of alkaline earth metal cations, and B' and B'' are both selected from the group consisting of transition metal cations.

In a particularly preferred embodiment, the perovskite can take the general form $(A'_{1-x}A''_{x})(B'_{1-y}B''_{y})O_{3-\delta}$, where A' and A'' are any cations, the average charge of A' and A'' is approximately +2, B' and B'' are any cations, the average charge of B' and B'' is approximately +4, and x and y are both less than or equal to 1. Preferably, both A' and A'' are selected from the group consisting of alkaline earth metal cations, and both B' and B'' are selected from the group consisting of transition metal cations.

In another preferred embodiment, the perovskite can take the form $BaBO_{3-\delta}$, where B is any cation having approximately at +4 charge. Preferably, B is selected from the group consisting of transition metal cations.

The perovskite of the invention can also take the form $Ba(B'_{1-y}B''_{y})O_{3-\delta}$, where B' and B'' are any cations, the average charge of B' and B'' is approximately +4, and y is less than or equal to 1. Preferably, B' and B'' are selected from the group consisting of transition metal cations.

In another preferred embodiment, the perovskite can take the form $(Ba_{1-x}A_{x})BO_{3-\delta}$, where A is any cation other than Ba, the average charge of Ba and A is approximately +2, B is any cation having approximately a +4 charge, and x is less than or equal to 1. Preferably, A is any alkaline earth metal cation other than Ba, and B is selected from the group consisting of transition metal cations.

In an even more preferred embodiment, the perovskite can take the form $(Ba_{1-x}A_{x})(B'_{1-y}B''_{y})O_{3-\delta}$, where A is any cation other than Ba, the average charge of Ba and A is approximately +2, B' and B'' are any cations, the average charge of B' and B'' is approximately +4, and both x and y are less than or equal to 1. Preferably, A is any alkaline earth metal cation other than Ba, and B' and B'' are both selected from the group consisting of transition metal cations.

In another preferred embodiment, the perovskite can take the general form $(Ba_{1-x}Sr_{x})(B'_{1-y}B''_{y})O_{3-\delta}$, wherein B' and B'' are any cations, the average charge of B' and B'' is approximately +4, and both x and y are less than or equal to one. Preferably, B' and B'' are selected from the group consisting of transition metal cations.

In yet another preferred embodiment, the perovskite can take the general form $(Ba_{1-x}Sr_{x})(Co_{1-y}Fe_{y})O_{3-\delta}$, where B is any cation other than Co, the average charge of Co and B is approximately +4, and x and y are both less than or equal to 1. Preferably, B is selected from the group consisting of transition metal cations.

In a more preferred embodiment, the perovskite can take the general form $(Ba_{1-x}Sr_{x})(Co_{1-y}Fe_{y})O_{3-\delta}$, where x and y are both less than or equal to 1. Preferably, x is 0.5 and y is 0.2.

In an alternative embodiment, the perovskite can be combined with a compatible electrolyte material. In this embodiment, the cathode material for use in the fuel cell comprises not only the perovskite, but also a porous interlayer of the electrolyte material. Preferably, the electrolyte material is present in the cathode active material in an amount ranging from about 0 to about 40% by weight of the total weight of the cathode active material. Nonlimiting examples of compatible electrolyte materials include SDC, gadallinium doped ceria, Sc doped zirconia, yttria doped zirconia and La—Sr—Ga—Mg—O perovskites.

In another alternative embodiment, the perovskite can be combined with a precious metal. In this embodiment, the cathode for use in the fuel cell comprises not only the perovskite, but also the precious metal. Preferably, the precious metal is present in the cathode active material in an amount ranging from about 0 to about 60% by weight of the total weight of the cathode active material. Nonlimiting examples of suitable precious metals include Ag, Au, Pt, Pd and mixtures thereof. In yet another alternative embodiment, the perovskite may be combined with both a porous interlayer of electrolyte material and a precious metal.

The accelerated diffusion of oxygen through perovskites employing a +2 charged A site cation and a +4 charged B site cation was first noticed during the development of a cubic perovskite in the $BaCoO_3$-$SrCoO_3$ system as a high temperature oxygen permeation membrane material, and reported in Shao, Z.P., Yang, W.S., Cong, T., Dong, H., Tong, J.H. & Xiong, G.X., "Investigation of the Permeation Behavior and Stability of a $Ba_{0.5}Sr_{0.5}Co_{0.8}Fe_{0.2}O_{3-\delta}$ Oxygen Membrane," *J. Membr. Sci.* 172, 177-188 (2000). However, perovskites of this configuration have not been used successfully as cathode active materials for reduced temperature solid oxide fuel cells. Related materials, such as $SrCo_{0.8}Fe_{0.2}O_{3-\delta}$ and Sr- or Mg-doped $LaGaO_3$ have been used as cathodes, but only under high operating temperatures, and they have exhibited only slight improvements in power generation over SSC.

In contrast, the perovskites of the present invention exhibit substantial improvement over SSC and are remarkably efficient at substantially reduced temperatures. In addition, as demonstrated by the following examples, these perovskites are effective at these lower temperatures in both single chamber and dual chamber fuel cells, and are compatible with known anode and electrolyte materials.

Figure 3:
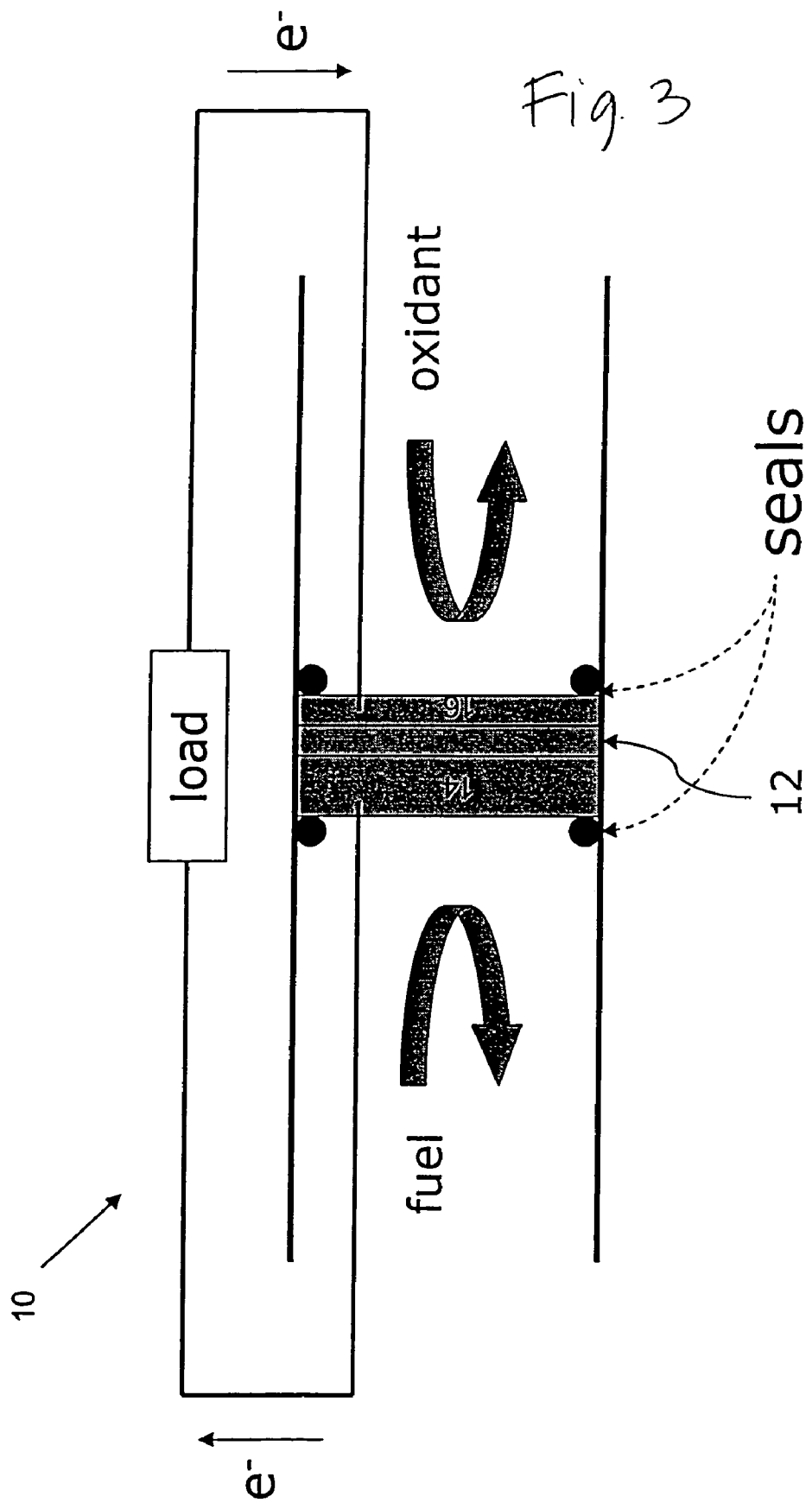
FIG. 3 is a schematic depicting a dual chamber fuel cell.
Figure 4:
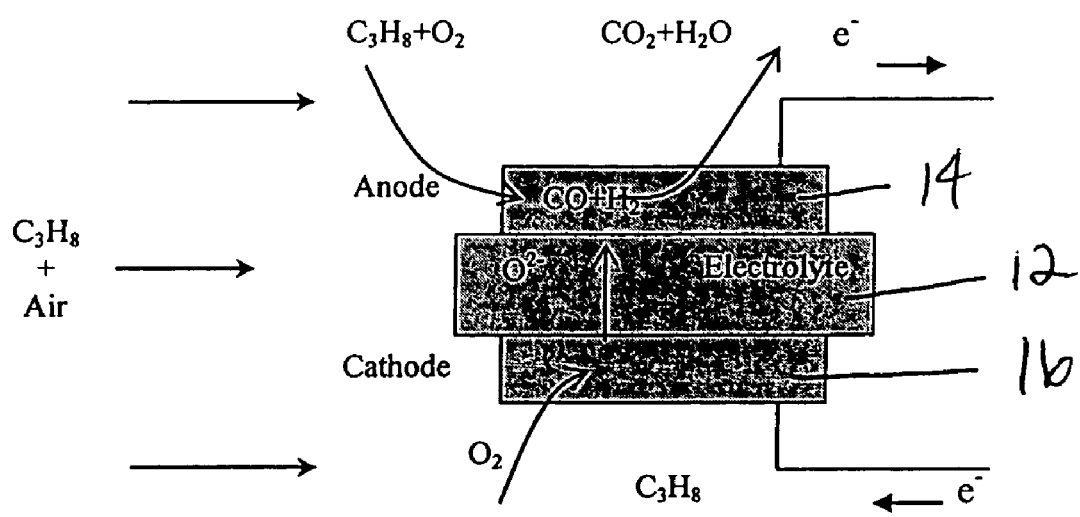
FIG. 4 is a schematic depicting a single chamber fuel cell.

A fuel cell 10 utilizing a cathode according to this invention is illustrated in FIGS. 3 and 4 and includes an anode 14, a cathode 16 and an electrolyte 12. A fuel cell may be operated in a conventional dual chamber configuration, as shown in FIG. 3, or in a single chamber configuration, as shown in FIG. 4. In a single chamber configuration, the anode 14 and cathode 16 of the fuel cell 10 are located in the same chamber and are exposed to the same oxidant-fuel mixture. The anode 14 is active and selective for fuel partial oxidation and for electrooxidation of the resulting $H_2$ and CO. The cathode 16, in contrast, is active and selective for oxygen-electroreduction.

A dual chamber fuel cell, as shown in FIG. 3, operates in much the same manner as the single chamber fuel cell. However, the anode 14 and cathode 16 of the fuel cell 10, in a dual chamber configuration, are located in separate chambers. Accordingly, the fuel and the oxidant do not combine in a dual chamber fuel cell. Rather, the fuel is introduced into the anode 14 chamber, and the oxidant, usually air, is introduced into the cathode 16 chamber. However, the functions of the anode 14 and cathode 16 are the same as in a single chamber fuel cell.

When used in dual chamber fuel cells, the perovskites of this invention are useful in the 350 to 1000° C. temperature range. However, the perovskites of the invention are particularly useful in the 350 to 800° C. range. For example, power densities ranging from about 100 to about 1000 mW/cm² were obtained at a temperature of approximately 600° C. Nonlimiting examples of compatible fuels for this dual chamber configuration include hydrogen, methane, propane and other hydrocarbons, and mixtures of fuel and water.

The perovskites of the invention are also useful in single chamber fuel cells utilizing fuel-oxidant mixtures. Nonlimiting examples of compatible fuels for this single chamber fuel cell include methane, ethane, propane and other hydrocarbons, such as alcohols. The oxidant is primarily air. Under these conditions, power densities ranging from about 100 to about 500 mW/cm² were obtained at temperatures ranging from 450 to 600° C.

EXAMPLE 1

Dual Chamber Fuel Cell

A conventional, trilayer fuel cell was constructed using samaria doped ceria (SDC) as the electrolyte. A 20 μm, thin electrolyte layer was supported on a 700 μm thick Ni+SDC anode having a porosity of approximately 46%. A 10 to 20 μm thick $Ba_{0.5}Sr_{0.5}Co_{0.8}Fe_{0.2}O_3$ (BSCF) cathode layer was deposited on the opposing side, after first depositing an additional porous interlayer of SDC (less than 5 μm in thickness). The cathode contained approximately 70% by weight BSCF and approximately 30% by weight SDC. The cathode was deposited on the electrolyte by spraying a colloidal solution, and then calcined at 950° C. for five hours. The cathode had an area of 0.71 cm² and a thickness of approximately 10 μm.

Air was supplied to the cathode chamber and 3% $H_2O$-humidified $H_2$ to the anode chamber. Peak power densities of approximately 1010 mW/cm² and 402 mW/cm² were obtained at 600 and 500° C. respectively. These values are more than twice those measured for a similar cell using a SSC+SDC cathode. In addition, the cell resistances under open circuit conditions were measured at various temperatures by impedance spectroscopy. The electrode polarization resistance , i.e. the sum of anode and cathode area specific resistances, is only approximately 0.021Ω-cm² at 600° C., and 0.135Ω-cm² at 500° C., amounting to just 14 and 26% of the resistance of the electrolyte at these respective temperatures. Although still very active for oxygen electroreduction, composite SDC+BSCF cathodes yielded lower power densities than simple BSCF cathodes. FIG. 1 shows the cell voltage and power densities of the BSCF cathode as functions of the current density.

EXAMPLE 2

Single Chamber Fuel Cell

The same trilayer fuel cell as in Example 1 was constructed and operated in a single chamber configuration with a propane+$O_2$+He mixture in a 4:9:36 volumetric ratio as the feed gas at a total flow rate of 490ml/min. The gas composition was kept constant with propane flowing at a rate of 40ml/min, $O_2$ flowing at a rate of 90 ml/min, and He flowing at a rate of 360 ml/min. However, at 600° C., the $O_2$ flow rate was increased to 100 ml/min and the He flow rate was increased to 400 ml/min. The linear gas flow velocity was about 10-15 cm/s. A peak power density of approximately 391 mW/cm² was observed at a furnace set temperature of 575° C., with a current density at short circuit of approximately 1.9 A/cm². A power density of approximately 350 mW/cm² was observed at a temperature of 525° C. with a current density of 1.7 A/cm². An analogous fuel cell fabricated using SSC as the cathode yielded near zero power density at 575° C. and a power density of approximately 175 mW/cm² at 525° C., with a current density at short circuit of approximately 1.3 A/cm². An open cell voltage of 0.75 V was reached at 450° C., and decreased slightly with an increase of the furnace set temperature.

Figure 2:
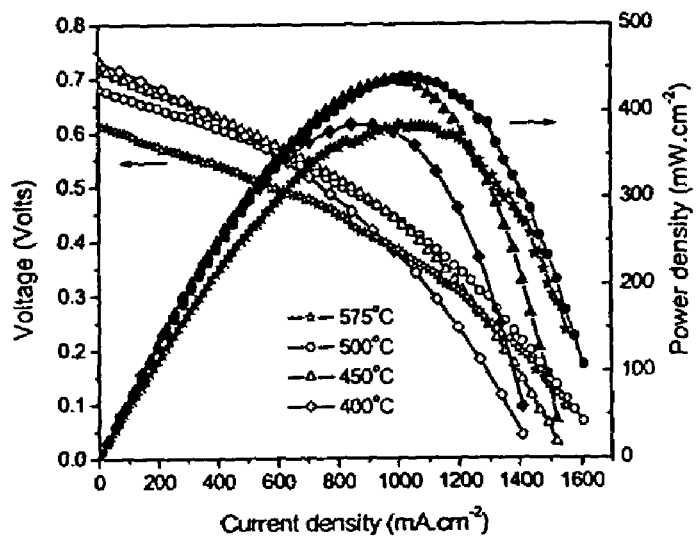
FIG. 2 is a graphical representation of the cell voltages and power densities of the BSCF+SDC cathode as functions of the current density, obtained through operation in a single chamber solid oxide fuel cell.

Upon modifying the BSCF cathode to incorporate 30 wt % SDC, significant improvements over simple BSCF were observed. A peak power density of approximately 440 mW/cm² was achieved at a furnace set temperature of 500° C. A comparably high power density of 403 mW/cm² at 500° C. has been reported for an electrolyte-supported fuel cell using SSC+SDC as the cathode and ethane as the fuel. However, this cathode was incompatible with propane at temperatures higher than 450° C. Because of the heat release during partial oxidation at the anode, the real temperature of the single chamber fuel cell is about 150 to 245° C. higher than the furnace set temperature, depending on the operation conditions. This self-heating phenomenon in single chamber fuel cell configurations accounts for the higher power densities achieved in single chamber configurations as compared to dual chamber configurations at nominally low temperatures. FIG. 2 shows the cell voltage and power densities of the BSCF+SDC cathode as functions of the current density.

Testing Methods

The mechanisms responsible for the excellent performance of these cathode active materials were identified by oxygen permeability measurements and extensive impedance spectroscopy studies of symmetric cells using a BSCF perovskite configuration. The oxygen permeation measurements, combined with thermal gravimetric analysis to determine the oxygen vacancy concentration as a function of oxygen partial pressure, revealed that the oxygen vacancy diffusion rate is $1.3 \times 10^{-4}$ cm²/s at 900° C. and $7.3 \times 10^{-5}$ cm²/s at 775° C. In comparison, a $Sm_{0.5}Sr_{0.5}CoO_3$ (SSC) perovskite configuration has a reported value of $8.6 \times 10^{-7}$ cm²/s at 915° C., a $La_{0.6}Sr_{0.4}Co_{0.2}Fe_{0.8}O_3$ (LSCF) perovskite configuration has a value of $8.4\times10^{-6}$ cm$^2$/s at 900° C., and a $SrCo_{0.8}Fe_{0.2}O_3$ (SCF) perovskite configuration has a value of $5.1\times10^{-5}$ cm$^2$/s at 900° C. In addition, the activation energy for oxygen diffusion in BSCF was found to be less than half that for oxygen surface exchange, i.e. 46±2 kJ/mol versus 113±11 kJ/mol, suggesting that oxygen surface exchange is the rate limiting step at low temperatures and that the exceptionally high oxygen diffusivity through BSCF gives it its overall high rate of oxygen electro-oxidation. The oxygen ion conductivity is, in fact, higher than that of SDC, an electrolyte used in these solid oxide fuel cells.

Impedance spectroscopy of the symmetric cells also demonstrated that oxygen diffusion is rapid and surface exchange kinetics are rate limiting. Specifically, good linearity of the cathode area specific resistance versus reciprocal temperature was observed over the temperatures investigated, i.e. 400 to 725° C., and the derived activation energy (approximately 116 kJ/mol) was almost identical to that determined for the oxygen surface exchange step (113±114 kJ/mol). Also, at low temperatures, the cathode area specific resistance was sensitive to the presence of $CO_2$ and $H_2O$ in the atmosphere, gases which could only affect surface and not bulk properties. Additionally, an increase in the cathode thickness decreased the area specific resistance without changing the activation energy, a result presumably due to the increase in area over which surface exchange could occur. Finally, the possibility that interfacial charge transfer could be the rate limiting step was eliminated by the fact that no arc associated with this step appeared in the impedance data.

When used in single chamber fuel cells, cathode active materials must exhibit a low activity toward fuel oxidation under the oxidant and fuel environment. The perovskite cathode materials of this invention not only exhibit high activity of oxygen electroreduction, but also exhibit low activity toward fuel oxidation needed for use in single chamber fuel cells. For example, under stoichiometric conditions, i.e. $O_2$ to propane ratio of 5:1 with 95 vol % helium, and at 500° C., the propane conversion rates over BSCF, LSCF and SSC are 5.3%, 35.5% and 16.1% respectively.

The preceding description has been presented with reference to presently preferred embodiments of the invention. Workers in the art and technology to which this invention pertains will appreciate that alterations and changes may be made to the described embodiments without meaningfully departing from the principal, spirit and scope of this invention. Accordingly, the foregoing description should not be read as pertaining only to the precise embodiments described, but rather should be read consistent with and as support for the following claims, which are to have their fullest and fairest scope.

What is claimed is:

1. A solid oxide fuel cell comprising:
   a cathode comprising a compound of the general form $Ba_{0.5}Sr_{0.5}Co_{0.8}Fe_{0.2}O_{3-\delta}$ having a perovskite crystal structure, wherein $\delta$ is less than or equal to 1;
   an anode; and
   an electrolyte.
2. A solid oxide fuel cell according to claim 1, wherein the solid oxide fuel cell is a single chamber solid oxide fuel cell.
3. A solid oxide fuel cell according to claim 1, wherein the solid oxide fuel cell is a dual chamber solid oxide fuel cell.

* * * * *